United States Patent [19]

Sakane et al.

[11] Patent Number: 5,437,090
[45] Date of Patent: Aug. 1, 1995

[54] METHOD OF MAKING A ROTOR OF AN INDUCTOR TYPE ALTERNATING CURRENT GENERATOR

[75] Inventors: Yukio Sakane; Yutaka Kitamura, both of Himeji, Japan

[73] Assignee: Mitsubishi Denki Kabushiki Kaisha, Tokyo, Japan

[21] Appl. No.: 202,013

[22] Filed: Feb. 25, 1994

[30] Foreign Application Priority Data

Mar. 4, 1993 [JP] Japan .................................. 5-043802

[51] Int. Cl.$^6$ ........................................... H02K 15/02
[52] U.S. Cl. ...................... 29/598; 219/121.14; 219/121.64; 310/42; 310/263
[58] Field of Search ............... 29/598, 596; 310/263, 310/42; 219/121.14, 121.13, 121.63, 121.64

[56] References Cited

FOREIGN PATENT DOCUMENTS

41577 1/1992 Japan .

Primary Examiner—Carl E. Hall
Attorney, Agent, or Firm—Sughrue, Mion, Zinn, Macpeak and Seas

[57] ABSTRACT

A method of making a rotor of an inductor type alternating current generator formed by connecting opposedly and alternately disposed first and second claws 3a, 3b of first and second inductors excited by an excitation coil 8 in different polarities through a nonmagnetic ring 3c. Contacting portions 22, 23 of the first and second claws and the nonmagnetic ring are connected by a welding means from inner sides of the claws and in a direction inclined to an axial direction by a predetermined angle.

3 Claims, 8 Drawing Sheets

METHOD OF MAKING A ROTOR OF AN INDUCTOR TYPE ALTERNATING CURRENT GENERATOR

BACKGROUND OF THE INVENTION

1. Field of the Invention

This invention relates to an improvement in a method of making a rotor of an inductor type alternating current generator.

2. Discussion of Background

Figure 13:
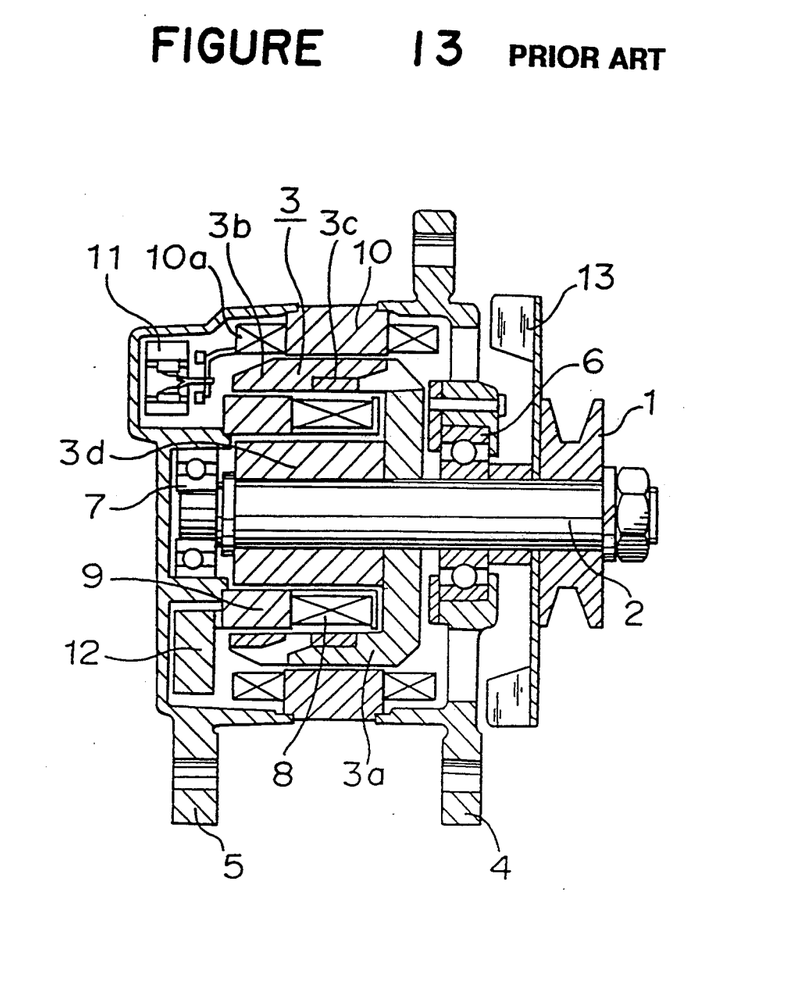
FIG. 13 is a sectional diagram showing a conventional inductor type alternating current generator.

FIG. 13 is a sectional diagram showing a conventional inductor type alternating current generator shown, for instance, in Japanese Examined Patent Publication No. 1577/1992. In FIG. 13, reference numeral 1 designates a pulley, 2, a shaft connected to the pulley 1, and 3, a rotor fixed to the shaft 2. In the rotor 3, notation 3a designates first claws composing a first inductor, 3b, second claws composing a second inductor, 3c, a nonmagnetic ring and 3d, a core. Reference numeral 4 designates a front bracket, and 5, a rear bracket, both of which rotatably support the shaft 2 through bearings 6 and 7. Numeral 8 designates an excitation coil fixed to the rear bracket 5 through the core 9, 10, a stator fixed between the front bracket 4 and the rear bracket 5, and 10a, a stator coil. Numeral 11 designates a rectifier fixed to the rear bracket 5 and connected to the stator coil 10a, 12, a regulator fixed to the rear bracket 5 and connected to the excitation coil 8, and 13, a rotating fan fixed to the shaft 2 along with the pulley 1.

The pulley 1 is driven to rotate by a prime mover, not shown, through a belt, by which the rotor 3 fixed to the shaft 2 is rotated. The first claws 3a and the second claws 3b of the rotor 3 are inductors excited by the excitation coil 8 in different polarities, which are alternately and oppositely disposed and which are connected and fixed to the nonmagnetic ring 3c.

An excited electromotive force is generated in the stator coil 10a when the rotor 3 is rotated and crosses a magnetic field generated by the excitation coil 8. This excited electromotive force generates a three-phase alternating current, which is full-wave-rectified into a direct current by the rectifier 11 and the direct current is supplied to a battery or an electric load. The regulator 12 controls a current flowing in the excitation coil 8 to maintain the electromotive force excited in the stator coil 10a at a constant voltage. The front bracket 4 and the rear bracket 5 compose an outer frame of the generator, which is attached and fixed to the prime mover. The fan 13 rotates along with the pulley 1 and cools the inside of the generator.

In the conventional inductor type rotor constructed as above, an electron beam welding device is employed as a means for connecting and fixing the first and second claws 3a and 3b and the nonmagnetic ring 3c.

Figure 14A:
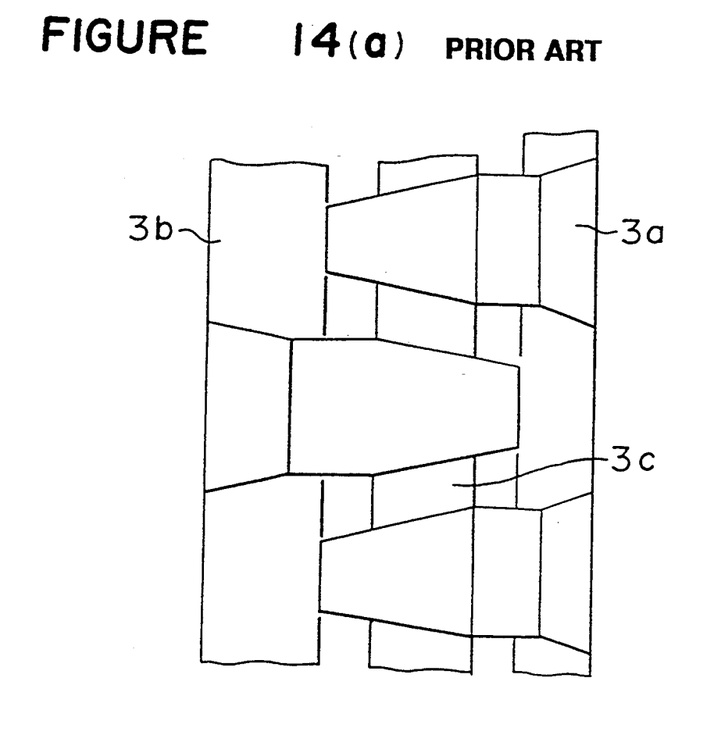
FIG. 14(a) is a plane view showing claws 3a and 3b and a nonmagnetic ring 3c, and FIG. 14(b), a sectional diagram showing the claws 3a and 3b and the nonmagnetic ring 3c.
Figure 14B:
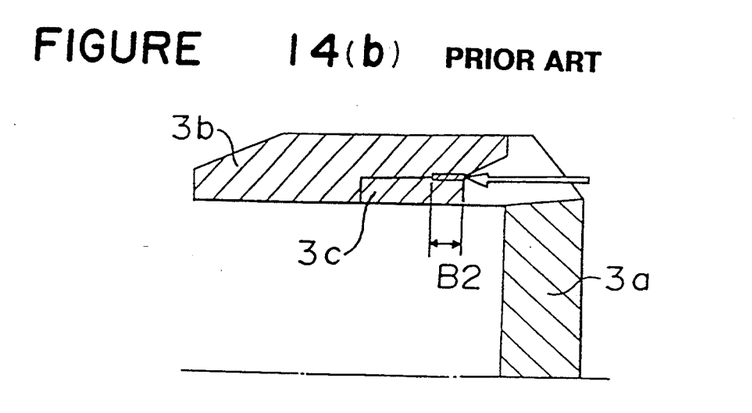
Figure 15:
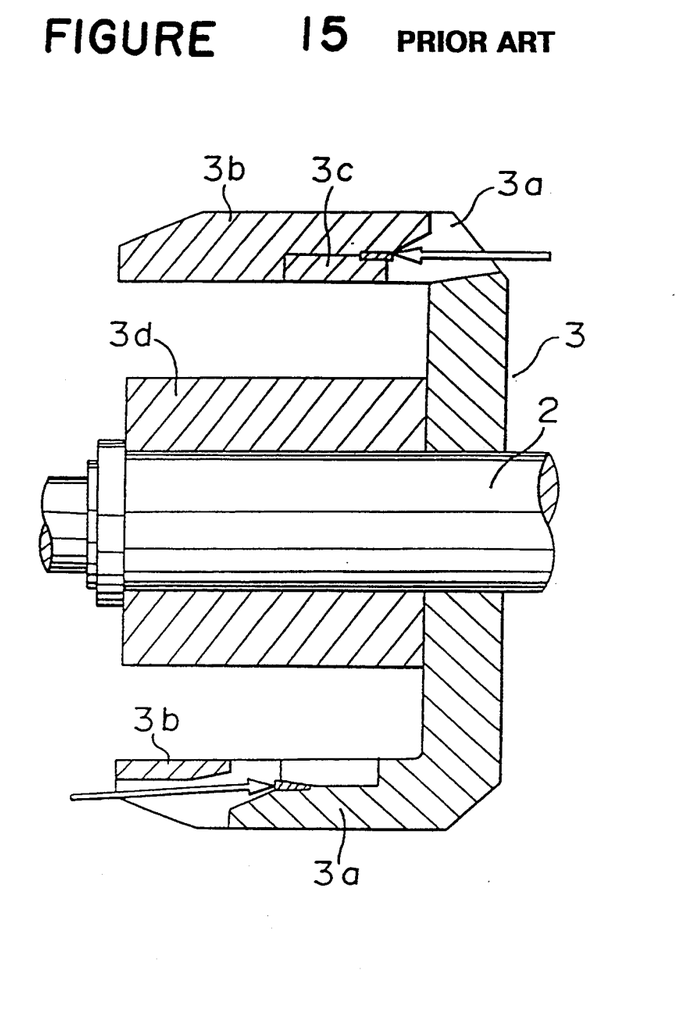
FIG. 15 is a sectional diagram showing a step of welding claws 3a and 3b and a nonmagnetic ring 3c by a conventional electron beam welding method.

As shown in FIGS. 14(a), 14(b) and 15, in the electron beam welding device, an electron beam is directly irradiated to contact faces of the first claws 3a or the second claws 3b and the nonmagnetic ring 3c, from distal ends of the first claws 3a or the second claws 3b along an axial direction, to thereby weld and connect the first claws 3a, the second claws 3b and the nonmagnetic ring 3c.

In the conventional method of welding by an electron beam device, the electron beam is irradiated from the distal end sides of the first claws 3a or the second claws 3b along the axial direction to thereby perform welding. Accordingly, the direction of irradiation of the electron beam differs among the first claws 3a and the second claws 3b. After the welding of the first claws 3a of one inductor and the nonmagnetic ring 3c has been finished, the direction of opening of the rotor is reversed by 180° and the second claws 3b of the other inductor and the nonmagnetic ring 3c are welded by irradiating again the electron beam from the same direction, whereby the welding operation is complicated and the operational performance is poor.

SUMMARY OF THE INVENTION

It is an object of the present invention to solve the above problem and to provide a method of making a rotor of an inductor type alternating current generator capable of welding claws of inductors and a nonmagnetic ring simply and efficiently in a short time.

According to an aspect of the present invention, there is provided a method of making a rotor of an inductor type alternating current generator formed by connecting oppositely and alternately disposed first claws and second claws of a first inductor and a second inductor excited by an excitation coil in different polarities through a nonmagnetic ring, wherein contact portions of the first and second claws and the nonmagnetic ring are connected by a welding means from inner sides of the first and second claws and in a direction inclined to an axial direction by a predetermined angle in connecting the first and second inductors.

According to the aspect of the invented method of making a rotor of an inductor type alternating current generator, the claws and the nonmagnetic ring can be welded from the same direction without reversing the direction of opening of the claws of the inductor in the rotor by 180°.

BRIEF DESCRIPTION OF THE DRAWINGS

FIGS. 14(a) and 14(b) are diagrams showing a conventional device wherein

DETAILED DESCRIPTION OF PREFERRED EMBODIMENTS

EXAMPLE 1

An explanation will be given of an embodiment of the present invention in reference to the drawings as follows.

Figure 1:
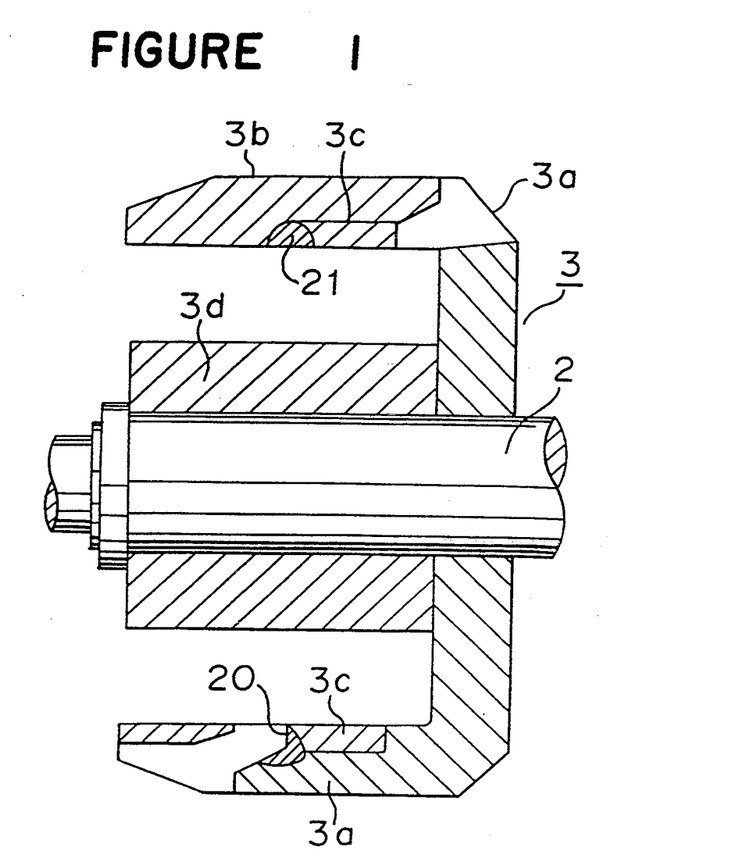
FIG. 1 is a sectional diagram showing a rotor in an embodiment of this invention.
Figure 2:
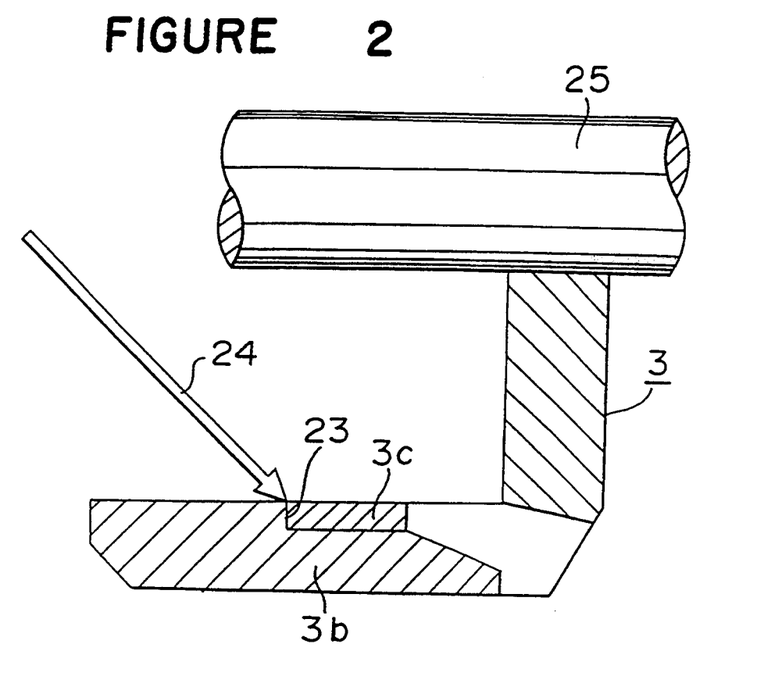
FIG. 2 is a sectional diagram showing a step of welding a claw 3b and a nonmagnetic ring 3c by an electron beam in an embodiment of the present invention.
Figure 3:
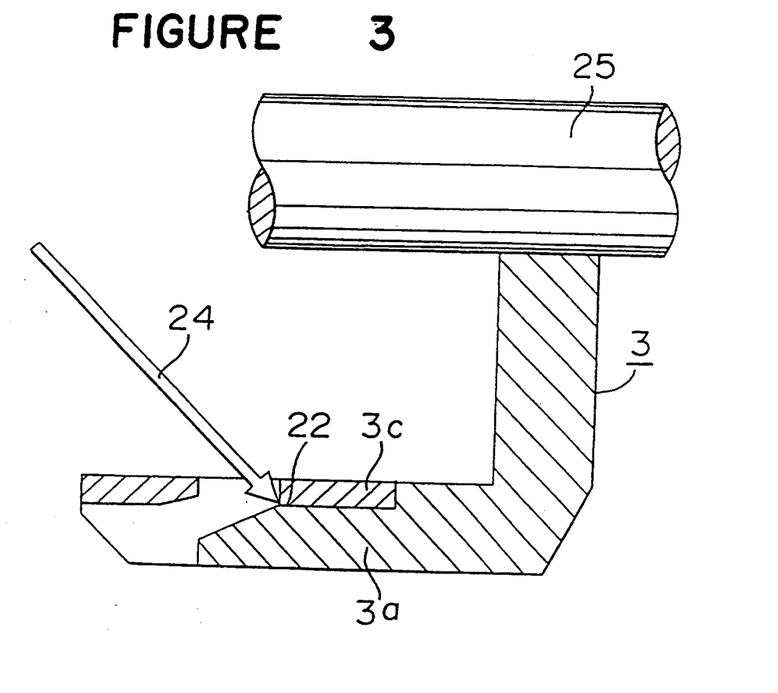
FIG. 3 is a sectional diagram showing a step of welding a claw 3a and a nonmagnetic ring 3c by an electron beam in an embodiment of the present invention.

In FIGS. 1 through 3, reference numeral 20 designates a portion for welding the claw 3a and the nonmagnetic ring 3c of one inductor, 21, a portion for welding the claw 3b and the nonmagnetic ring 3c of the other inductor, 22, contact portions of the claw 3a of the inductor and the nonmagnetic ring 3c, 23, contact portions of the claw 3b of the other inductor and the nonmagnetic ring 3c, and 24, an electron beam irradiated by an electron beam welder. Reference numeral 25 designates a jig for fixing the respective inductors and rotating the respective claws 3a and 3b in a rotation direction successively by the same angle (30° in case of 12 poles).

In the above construction, firstly, the claws 3a of the one inductor and the claws 3b of the other inductor are tacked by the jig in a state respectively interposing the nonmagnetic ring 3c.

Further, a shaft 25 is inserted into the respective inductors.

Under this state, the electron beam 24 is irradiated to the contact portions 22 of the claws 3a and the nonmagnetic ring 3c from the inner sides of the claws 3a and from a position inclined to the axial direction by 45°.

The nonmagnetic ring 3c and the claws 3a are locally melted by the irradiation of the electron beam 24 and are welded together as in the welded portion in FIG. 1.

Next, the shaft 25 is rotated in the rotational direction by 30°, the electron beam 24 is irradiated to the contact portions 23 of the claw 3b and the nonmagnetic ring 3c from the inner side of the claw 3b as above thereby welding and connecting the claw 3b and the nonmagnetic ring 3c.

The welding of all the claws 3a and 3b and the nonmagnetic ring 3c is completed by rotating the shaft 25 successively at intervals of 30° and by irradiating the electron beam 24 a total of 12 times.

Figure 4:
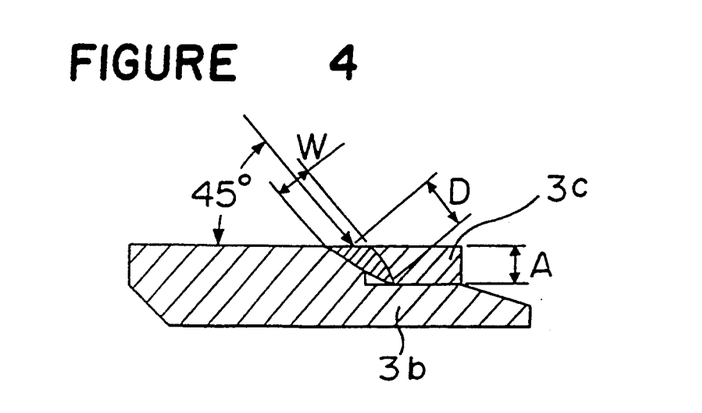
FIG. 4 is a sectional diagram showing a state after a claw 3b and a nonmagnetic ring 3c have been welded by an angle of inclination of 45° of an electron beam in an embodiment of the present invention.
Figure 5:
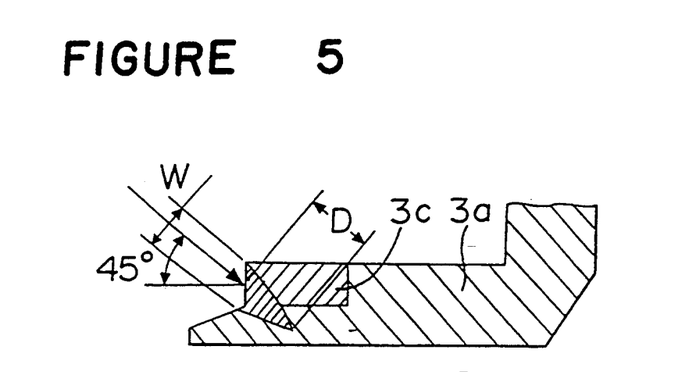
FIG. 5 is a sectional diagram showing a state after a claw 3a and a nonmagnetic ring 3c have been welded by an angle of inclination of 45° of an electron beam in an embodiment of the present invention.

Further, in case of welding by the electron beam 24, the width $\neq W$ and the depth $\neq D$ of the welded portions shown in FIGS. 4 and 5 can respectively be controlled and the bonding strength can easily be controlled by controlling ① the focus of beam, ② its strength or output, and ③ the moving speed of beam.

Figure 6:
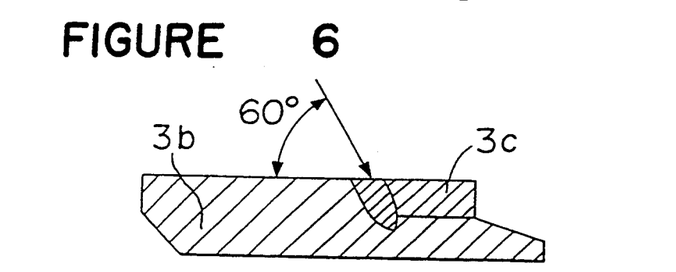
FIG. 6 is a sectional diagram showing a state after a claw 3b and a nonmagnetic ring 3c have been welded by an angle of inclination of 60° of an electron beam according to the present invention.
Figure 7:
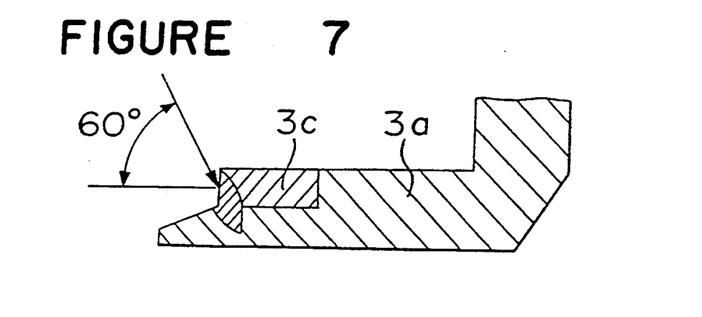
FIG. 7 is a sectional diagram showing a state after a claw 3a and a nonmagnetic ring 3c have been welded in an angle of inclination of 60° of an electron beam according to the present invention.

Further, the welding can be performed even when the dimension A of the nonmagnetic ring 3c is enlarged by setting the angle of irradiation of the electron beam 24 to an angle of inclination of 60° as shown in FIGS. 6 and 7, and the bonding strength can be controlled by controlling the angle of irradiation of the electron beam 24.

The angle of inclination of the beam in the electron beam welding can be selected in a range of 30° through 70°, and particularly 45° is preferable.

Especially, according to the electron beam welding,
① a thin and deep molten portion can be provided and the bonding strength can easily be provided:
② The thermal deformation and the thermal influence can extremely be restrained and the rotor can accurately be made:
③ the degree of freedom of beam control (welding strength, beam irradiation position, deviated welding etc.) is considerable and the welding operation is facilitated, which is suitable for mass production.

EXAMPLE 2

Figure 8:
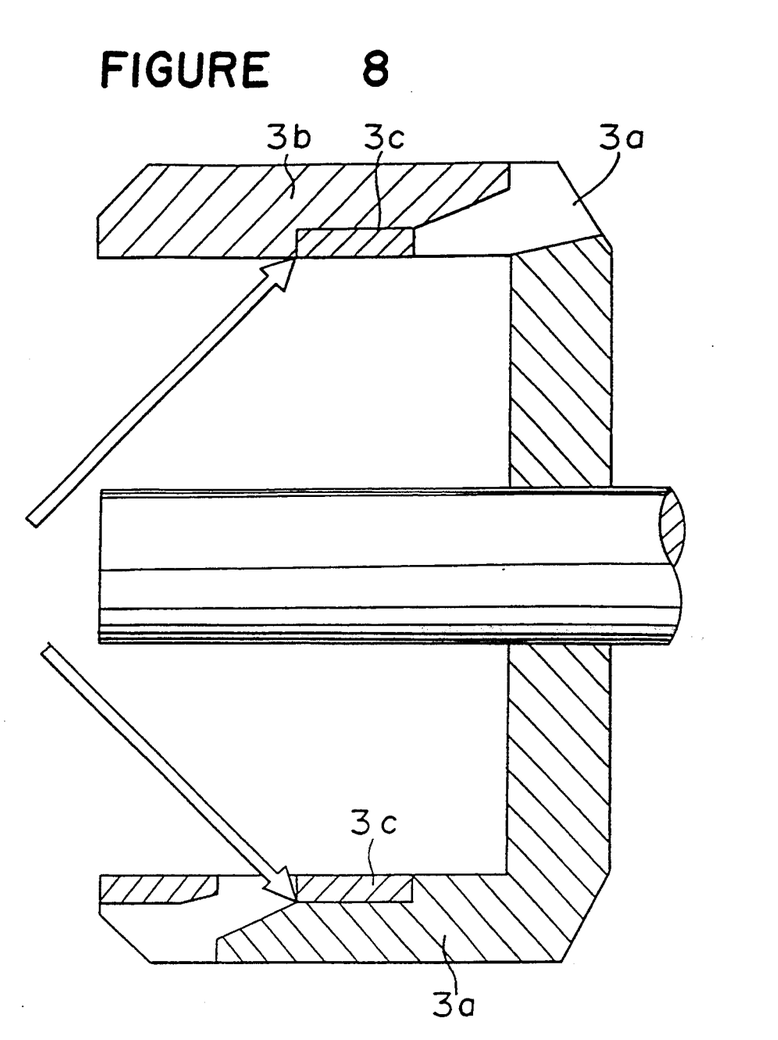
FIG. 8 is a sectional diagram showing a method of welding according to another embodiment of the present invention, wherein a rotor is fixed and a direction of an electron beam is successively moved.

In the above Example, the inductors having the claws 3a and 3b are rotated successively at a predetermined angle, and the position and direction of the irradiation by the electron beam are fixed. However, the welding may be performed by fixing the inductors having the claws 3a and 3b and by successively changing the direction of the irradiation of the electron beam 24 as shown in FIG. 8.

EXAMPLE 3

Figure 9:
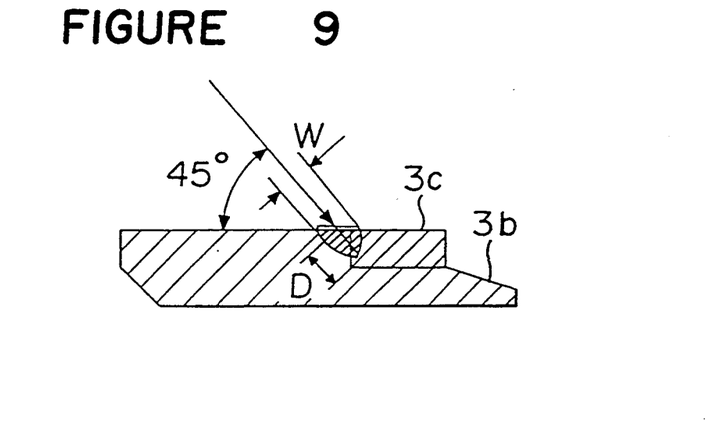
FIG. 9 is a sectional diagram showing a state after a claw 3b and a nonmagnetic ring 3c have been welded by a laser welding method according to the present invention.
Figure 10:
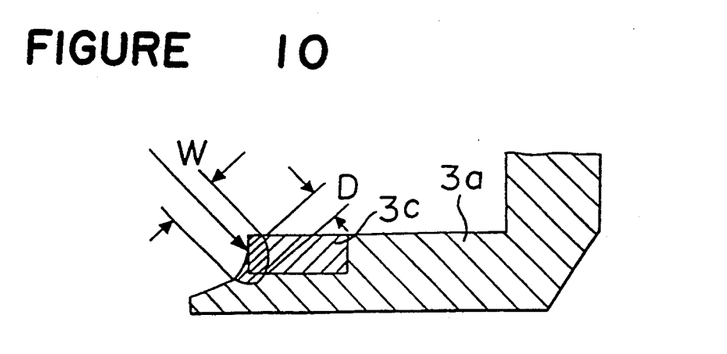
FIG. 10 is a sectional diagram showing a state after a claw 3a and a nonmagnetic ring 3c have been welded by a laser welding method according to the present invention.

Further, Examples have been shown with respect to electron beam welding. However, the invention is also applicable to laser welding. These examples are shown in FIGS. 9 and 10. In case of laser welding, W/D is enhanced compared with electron beam welding.

EXAMPLE 4

Figure 11:
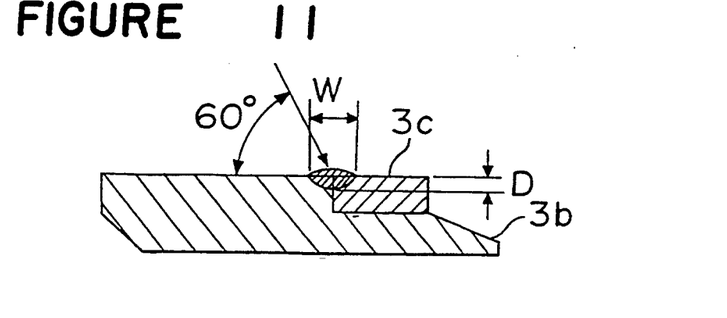
FIG. 11 is a sectional diagram showing a state after a claw 3b and a nonmagnetic ring 3c have been welded by a TIG welding method according to the present invention.
Figure 12:
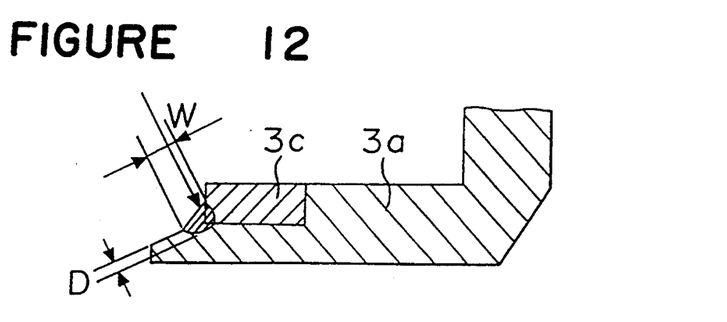
FIG. 12 is a sectional diagram showing a state after a claw 3a and a nonmagnetic ring 3c have been welded by a TIG welding method according to the present invention.

Further, as shown in FIGS. 11 and 12, the welding may be performed by TIG welding or MIG welding. In these Examples W/D is further enhanced compared with laser welding.

As stated above, according to the present invention, the contact portions of the claws of the inductors and the nonmagnetic ring are welded by a welding means from the inner sides of the claws of the inductors and from the positions which are inclined with respect to the axial direction by a predetermined angle.

Accordingly, the respective claws and the nonmagnetic ring can be welded from the same direction without reversing the direction of opening of the claws of the inductor in the rotor by 180°, and the invention provides an effect wherein the welding can be performed simply, efficiently and in a short time.

What is claimed is:

1. A method of making a rotor of an alternating current generator, comprising the steps of:
   a) disposing a plurality of first claws (3a) and second claws (3b) of respective first and second cylindrical inductors in an alternate, oppositely directed, interleaved orientation, b) disposing a nonmagnetic ring (3c) in contact with inner portions of the first and second claws, and c) welding together contacting portions (22, 23) of the first and second claws and the nonmagnetic ring using welding means outputting energy (24) directed at said contacting portions from inner sides of the first and second claws and in a direction inclined to an axial direction of the rotor at a predetermined angle lying in a range of 30°–70°.

2. The method of making a rotor of an alternating current generator according to claim 1, wherein the welding means is fixed and welds the first and second claws and the nonmagnetic ring by successively rotating the first and second claws and the nonmagnetic ring.

3. The method of making a rotor of an alternating current generator according to claim 1 or claim 2, wherein the welding means performs electron beam welding.

* * * * *